United States Patent [19]

Lefranc

[11] Patent Number: 5,775,772
[45] Date of Patent: Jul. 7, 1998

[54] CHILD SEAT

[75] Inventor: Louis Lefranc, Nantes, France

[73] Assignee: Ampafrance S.A., Cholet, France

[21] Appl. No.: 660,897

[22] Filed: Jun. 7, 1996

[30] Foreign Application Priority Data

Jun. 7, 1995 [FR] France .................. 95 06705
Nov. 20, 1995 [FR] France .................. 95 13732

[51] Int. Cl.$^6$ .................................................. A47C 1/08
[52] U.S. Cl. ................................. 297/250.1; 297/485
[58] Field of Search ........................ 297/253, 216.11, 297/250.1, 485

[56] References Cited

FOREIGN PATENT DOCUMENTS

A-0-353 377  2/1989  European Pat. Off.
A-0447 097   9/1991  European Pat. Off.
41 08 660    9/1992  Germany.

*Primary Examiner*—Peter M. Cuomo
*Assistant Examiner*—David E. Allred
*Attorney, Agent, or Firm*—Pennie & Edmonds LLP

[57] ABSTRACT

Child seat including a seat part 2 and a back part 3 adapted to be placed on and fixed to an automobile vehicle seat 5 equipped with a three-point safety belt 6 having a lap portion 7 and a chest portion 9, characterized in that the seat part 2 is adapted to be placed directly on the automobile vehicle seat 5 and includes guides such as a passage 18 at the bottom for the lap portion 7 of the safety belt and in that the back part 3 has, on its rear face, a mechanism 24 for guiding and immobilizing the chest portion 9 of the safety belt, said guide and immobilizing mechanism being adjustable in height on the back part and further including a mechanism for fixing the ends 22 of shoulder straps of a safety harness 23 passing through the back part of the child seat.

16 Claims, 5 Drawing Sheets

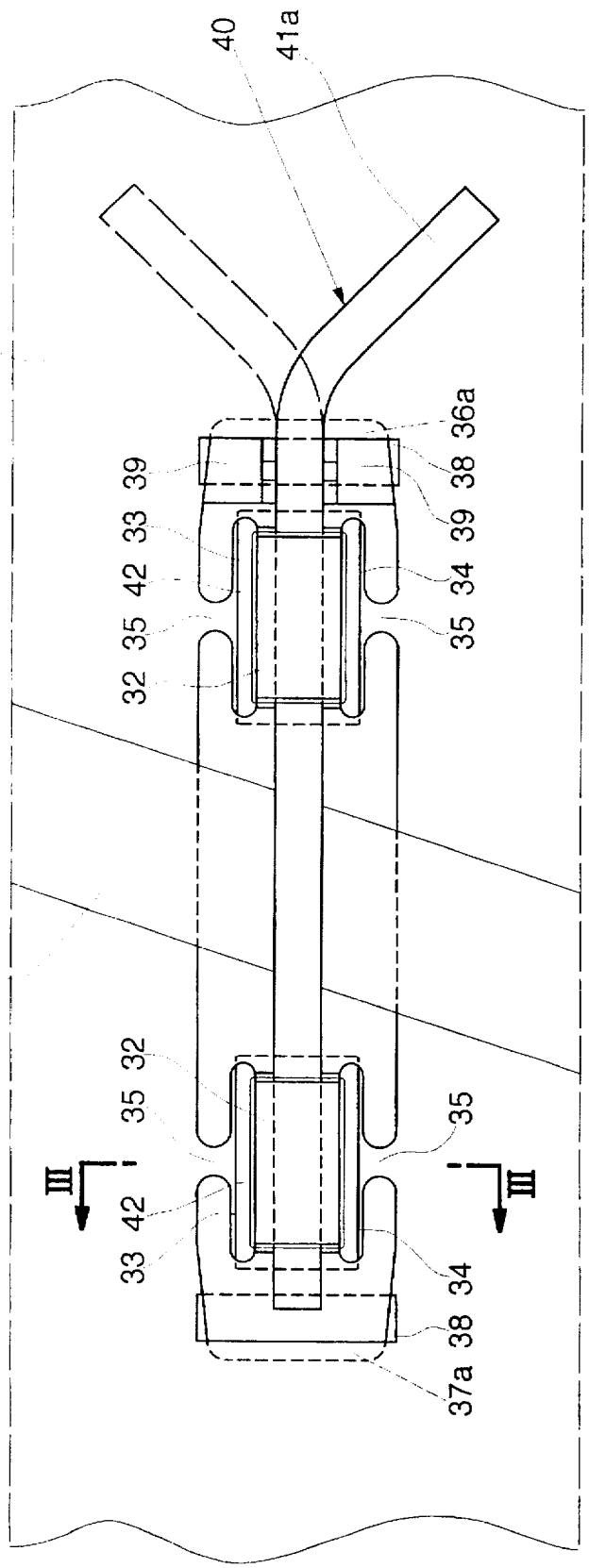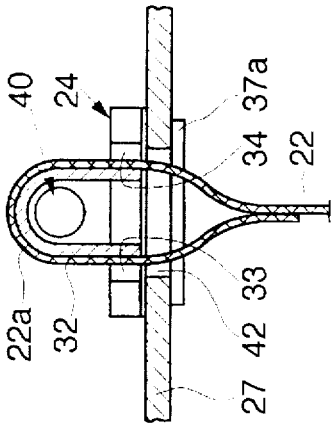

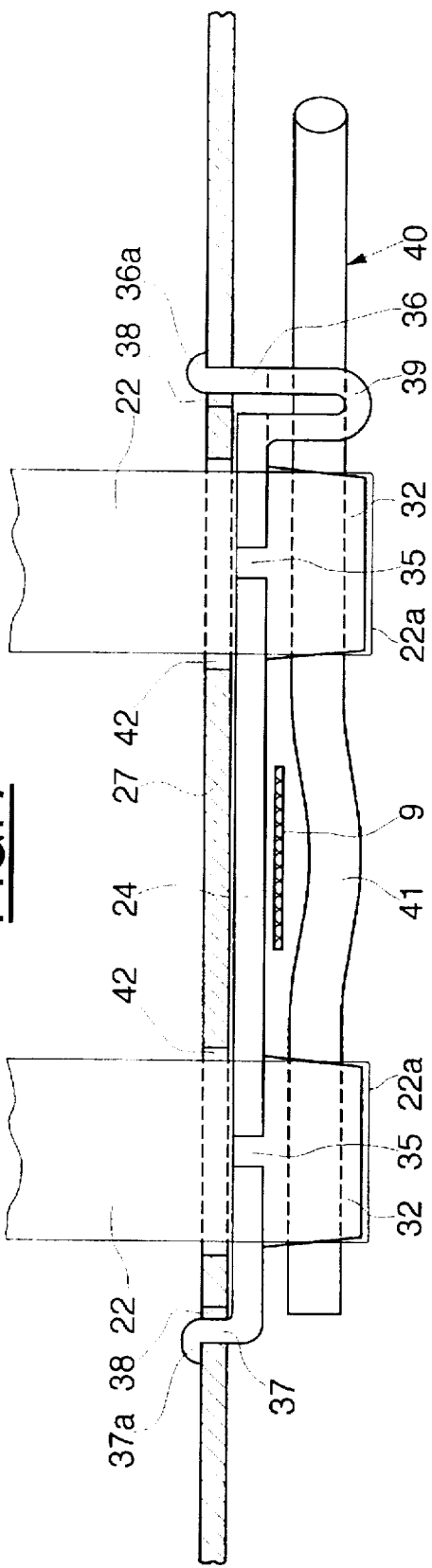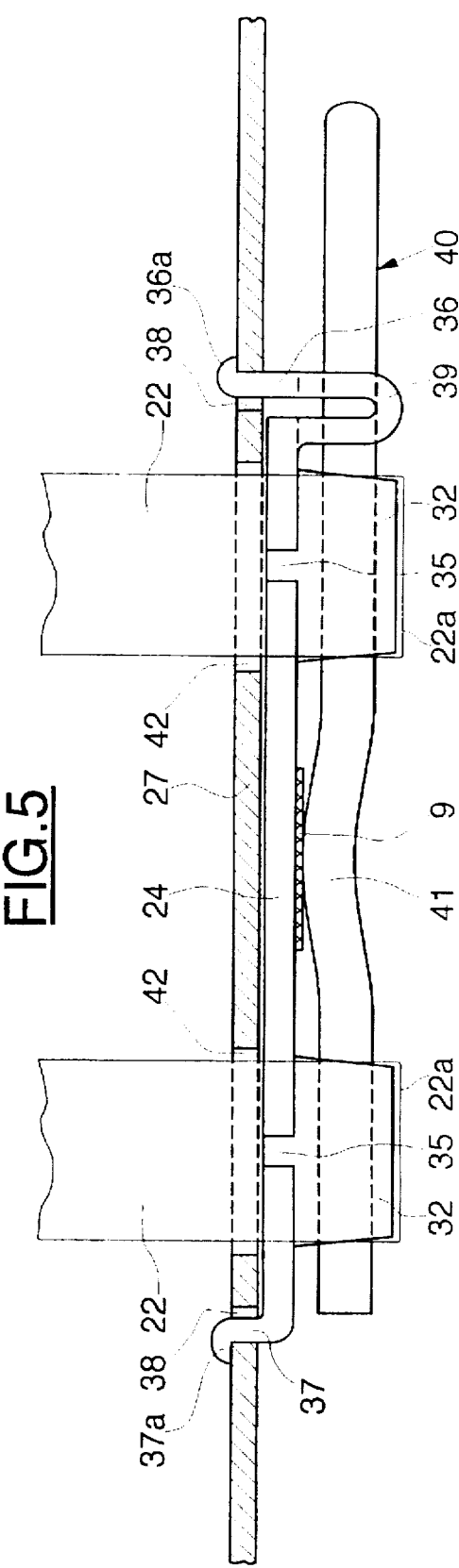

CHILD SEAT

The present invention concerns a child seat including a seat part and a back part designed to be placed on and fixed to an automobile vehicle seat provided with a three-point safety belt.

Child seats of this type can be fixed to the automobile vehicle seat in various ways. In some cases they are fixed by a special strap that attaches to the anchorage points of the automobile vehicle safety belts. This kind of fixing has the drawback of requiring special fixing means for the child seat.

Other prior art child seats designed to be used in an automobile vehicle are fixed to the seat of the automobile vehicle by means of the safety belt, usually of the three-point type, i.e. including a lap portion and a chest portion, fitted as standard to the vehicle seat. The child seat is usually held in position by passing the lap portion of the vehicle safety belt through openings provided in a support that is placed on the vehicle seat and to which the seat part of the child seat is fixed, possibly with an adjustment facility. The chest portion of the safety belt of the vehicle seat can be passed through the same place as the lap portion, as described for example in European patent application 447 097 (Britax). In other versions, as described for example in European patent application 353 377 (Concord), the chest portion of the vehicle safety belt is passed behind the back part of the child seat in guide means provided on said back part. The guide means may also have provision for immobilizing the chest portion of the safety belt, as described for example in published German patent application No 41 08 660.

Published German patent application No 41 21 795 (Würstl) describes a child seat including a support base attached to the vehicle seat by passing the lap portion of the vehicle safety belt through it. This child seat, fixed to the support base, includes a safety harness the ends of which can be fixed to a member fixed permanently to the rear wall of the back of the seat and which also guides the chest portion of the vehicle safety belt, but without immobilization it. An arrangement of this kind is somewhat complex due to the presence of the support base. Furthermore, the seat cannot be adapted to suit the height of the child and the lack of immobilization of the chest portion of the belt prevents convenient and stable retention of the child seat to the vehicle seat.

The general structure of all these prior art child seats is thus somewhat complex because of the support designed to be placed on the automobile vehicle seat and receiving the seat part of the child seat, and the retention of the seat and of the child regardless of the height of the child is not entirely satisfactory.

Other child seats are placed directly on the seat of the automobile vehicle and a child of sufficient height is restrained by the safety belt of the vehicle, which simultaneously restrains the child seat. However, this type of arrangement is not suitable for children aged less than one to two years, usually weighing between 9 and 18 kg. It is preferable to restrain such children by means of a special harness. In this case other means must be provided for fixing the child seat to the seat of the vehicle.

The object of the present invention is a child seat designed to be mounted on an automobile vehicle seat and having a structure that is much simpler to manufacture than prior art type seats, which is easy to place on the seat of the automobile vehicle and which is effectively held by the safety belt with which the latter is provided.

Another object of the invention is a seat of this type in which, in the event of an accident, forces are entirely absorbed by the vehicle safety belt, the child being held in their seat by means appropriate to their height.

Another object of the invention is a child seat of this kind that can be readily adapted to suit the height of the child.

The child seat of the present invention includes a seat part and a back part and is adapted to be placed on and fixed to an automobile vehicle seat equipped with a three-point safety belt having a lap portion and a chest portion. In accordance with the invention, the seat part is adapted to be placed directly on the automobile vehicle seat and includes guide means for the lap portion of the safety belt, for example a passage in its bottom portion. The back part has, on its rear face, means for guiding and immobilizing the chest portion of the safety belt, said guide and immobilizing means being adjustable in height on the back part and further including means for fixing the ends of shoulder straps of a safety harness passing through the back part of the child seat.

In a preferred embodiment, the guide and immobilizing means comprise a mounting plate provided with retaining members for a locking member mobile between a first position allowing insertion of the chest part of the belt, a second portion in which said chest portion is guided and a third position in which said chest portion of the belt is immobilised.

The retaining members are advantageously in the form of two saddles cooperating with a sliding rod having a curved part providing the locking member.

The mounting plate preferably has on opposite sides of the retaining members open slots through which ends of the shoulder straps of the safety harness can be passed and fixed to the retaining members.

The ends of the shoulder straps, which form loops, can then surround the saddles, which ensures that in the event of an accident the forces are absorbed directly by the chest portion of the vehicle safety belt.

In a preferred embodiment the mounting plate comprises clipping means adapted to cooperate with the edges of slots provided at different heights in the back part of the seat.

The lateral surfaces of the seat part can include parts, for example hook-shaped parts, delimiting one side of open slots adapted to receive the lap portion of the safety belt. Each hook can incorporate a bearing rim for the lap portion of the safety belt.

In this way the seat can be used for taller children, after removing the safety harness, the child being held in the seat by the chest portion of the safety belt, which in this case passes in front of the child. The lap portion of the belt passes over the thighs of the child, being held in position by the aforementioned hooks.

To this end the safety harness fixing and anchorage means are such that the safety harness can be detached from the child seat.

The back part may be hinged to the seat part to enable the back part to be inclined to different degrees, with the facility to separate the back part and the seat part in order to reduce the bulk of the seat when not in use.

The seat part preferably comprises anchorage means for a crotch strap of the safety harness.

The invention will be better understood from a description of one detailed embodiment given by way of non-limiting example and with reference to the appended drawings, in which:

FIG. 2 is an elevation view to a larger scale of the guide and locking means mounted on the rear wall of the seat back;

FIG. 3 is a view in section on the line III—III in FIG. 2;

FIG. 4 is a side view of the guide and locking means in the position for guiding the chest portion of the belt;

FIG. 5 is a view analogous to FIG. 4 showing the locked position;

Figure 1:
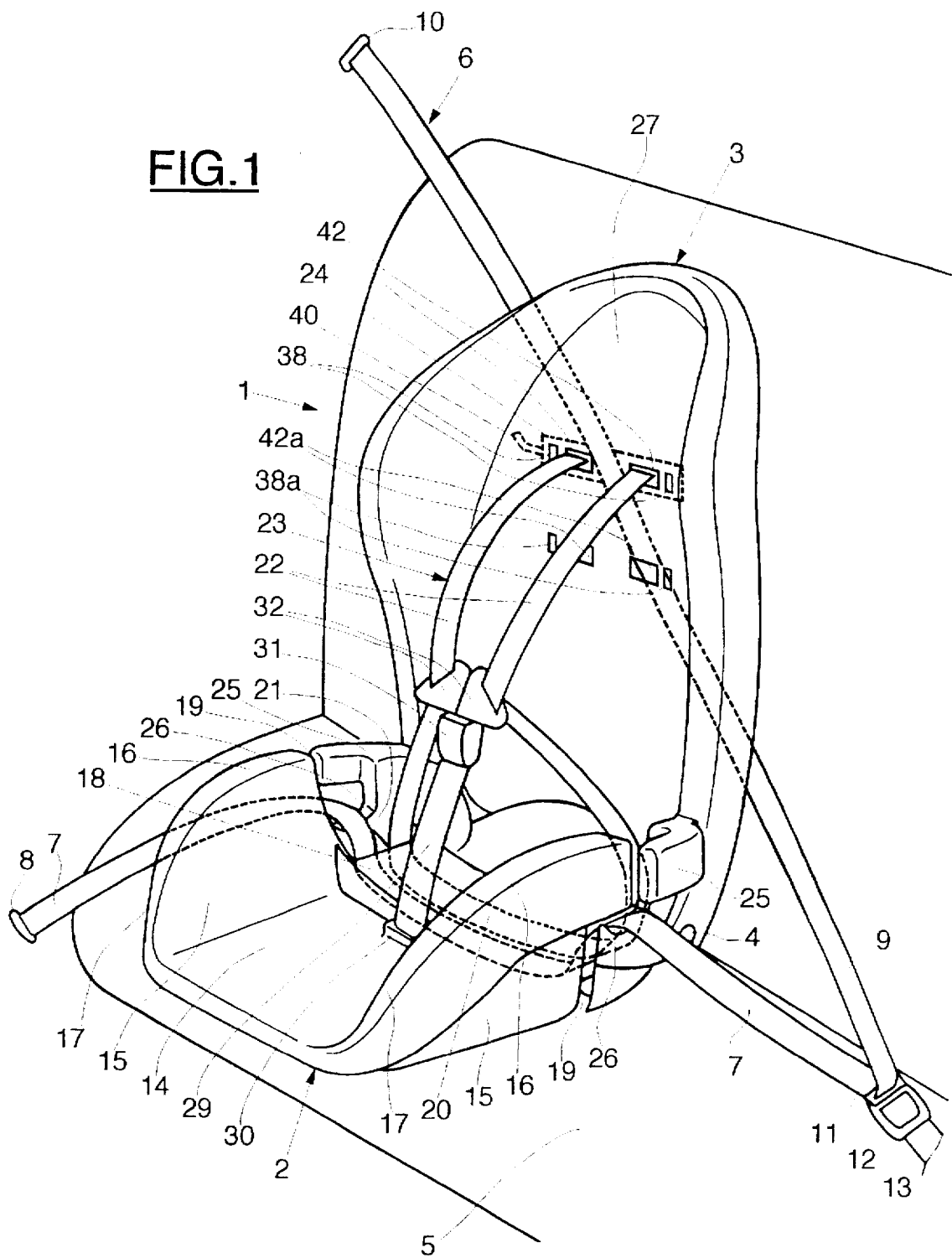
FIG. 1 is a perspective view showing a child seat of the invention installed on an automobile vehicle seat, the padding of the child seat being omitted to simplify the drawing.

As shown in FIG. 1, the child seat 1 of the invention comprises a seat part 2 and a back part 3 articulated to the seat part about a horizontal hinge pin 4. The seat 1 is placed on an automobile vehicle seat 5 provided with a three-point safety belt 6 having an lap portion 7 fixed to an anchor point 8 on the vehicle, low down on the bodyshell, and a chest portion 9 fixed to an anchor point 10 attached to a point high up in the bodyshell of the vehicle.

In the usual way, the lap portion 7 and the chest portion 9 are parts of one and the same belt which passes freely through a buckle 11 that can be inserted into a locking device 12 attached to the bodyshell of the vehicle, usually by means of a strap 13 projecting from between the seat cushion and the back cushion of the vehicle seat 5.

The seat part 2 of the seat 1 is adapted to be placed directly on the seat 5 of the vehicle, as can be seen in FIG. 1, without the need to provide any kind of support between the child seat 1 and the vehicle seat 5. The seat part 2 has identical and symmetrical lateral surfaces 15 which define rims 16 for the seat part. These rims are preferably rounded and have an inclined front part 17 away from the back part.

The bottom surface of the seat part 2 incorporates a trough-like passage 18 communicating with two open slots 19 in the lateral surfaces 15 extending from the rims 16 to said passage 18. The width of the passage 18 matches that of the safety belt 6 and can therefore receive the lap portion 7.

The bottom surface of the seat part 2 further includes a second trough-like passage 20 communicating with openings 21. The passage 20 is adapted to receive shoulder straps 22 of a safety harness 23. The free ends of the shoulder straps 22 pass through the wall 27 of the back part 3 of the seat 1 and are fixed to a mounting plate 24 (see below).

In this embodiment the lateral surfaces 15 further include hook-shape parts 25 which delimit parts of one side of the open slots 19. Each hook 25 has in its lower part a bearing rim 26 over which the lap portion 7 of the safety belt 6 can pass and on which the latter bears.

A crotch strap 29 is removably fixed to the seat part 2 by anchorage means 30. The crotch strap carries a locking device 31 that can also receive buckles 32 sliding along the branches of the shoulder straps 22 of the harness. When the child has been placed on the seat, the harness 23 is fastened by fixing the buckles 32 onto the locking device 31.

As can be seen in FIGS. 2 through 5, the guide and locking means for the chest portion 9 of the safety belt 6 is formed by the mounting plate 24. This is generally oblong in shape, preferably made of metal and thick enough to have the necessary mechanical strength. The mounting plate 24 has near each end a retaining member in the form of a saddle 32 attached to the mounting plate 24. On opposite sides of the two saddles 32 are open slots 33, 34 with dimensions adapted to receive ends of the shoulder straps 22 formed into buckles 22a (FIG. 3). The openings 35 of the open slots 33, 34 enable the buckles 22a to be slipped off the saddles 32 and then over end parts of the mounting plate 24 after the latter has been detached from the rear wall 27 of the back part 3 (see below). This enables the shoulder straps 22 of the safety harness 23 to be entirely removed.

Near its two ends the mounting plate 24 includes projecting lugs 36, 37 (FIG. 4) perpendicular to the plane of the plate 24 and adapted to enter slots 38 in the wall 27 of the back 3. The ends of the lugs 36 and 37 incorporate hooked clips 36a, 37a. At one end of the plate 24 the projecting lug 36 has two U-shape portions 39 to make it more resilient and thus to facilitate clipping the plate 24 onto the back part 3.

In the example shown the mobile locking member for the chest portion 9 of the safety belt 6 is in the form of a rod 40, preferably a metal rod having a diameter sufficient to provide the necessary mechanical strength; it can be passed through the orifices in the two saddles 32 and can slide relative to the mounting plate 24; it can therefore be removed completely or from only one of the two saddles 32 to allow insertion of the chest strap 9. The rod 40 has a curved portion 41 (FIGS. 4 and 5) and an angled end portion 41a. Rotating the rod 40 in one direction by hand using the angled end 41a places it in the position shown in FIG. 4 in which the curved portion 41 allows free movement of the chest strap 9. In this case the chest strap 9 is merely guided between the rod 41 and the mounting plate 24, the chest strap 9 being held between the two saddles 32 of the mounting plate 24 but not immobilized. Rotating the rod 40 by 180° in the opposite direction moves the curved portion 41 of the rod 10 to the position shown in FIG. 5 in which it clamps the chest belt 9 against the mounting plate 24 to provide effective locking the chest strap 9 in position relative to the back part 3 of the seat 1.

The ends of the shoulder straps 22 pass through two openings 42 in the wall 27 of the back part 3. As can be seen in FIG. 1, the back part 3 includes two groups of slots 38 and openings 42, the second group bearing the reference numbers 38a and 42a and being lower down than the first group. Thus the mounting plate 24 can be moved from the slots 38 to the slots 38a so that, after refitting the ends of the shoulder straps 22, the safety harness 23 is adjusted to suit a shorter child.

The child seat of the invention can be used in different ways depending on the height of the child.

Figure 6:
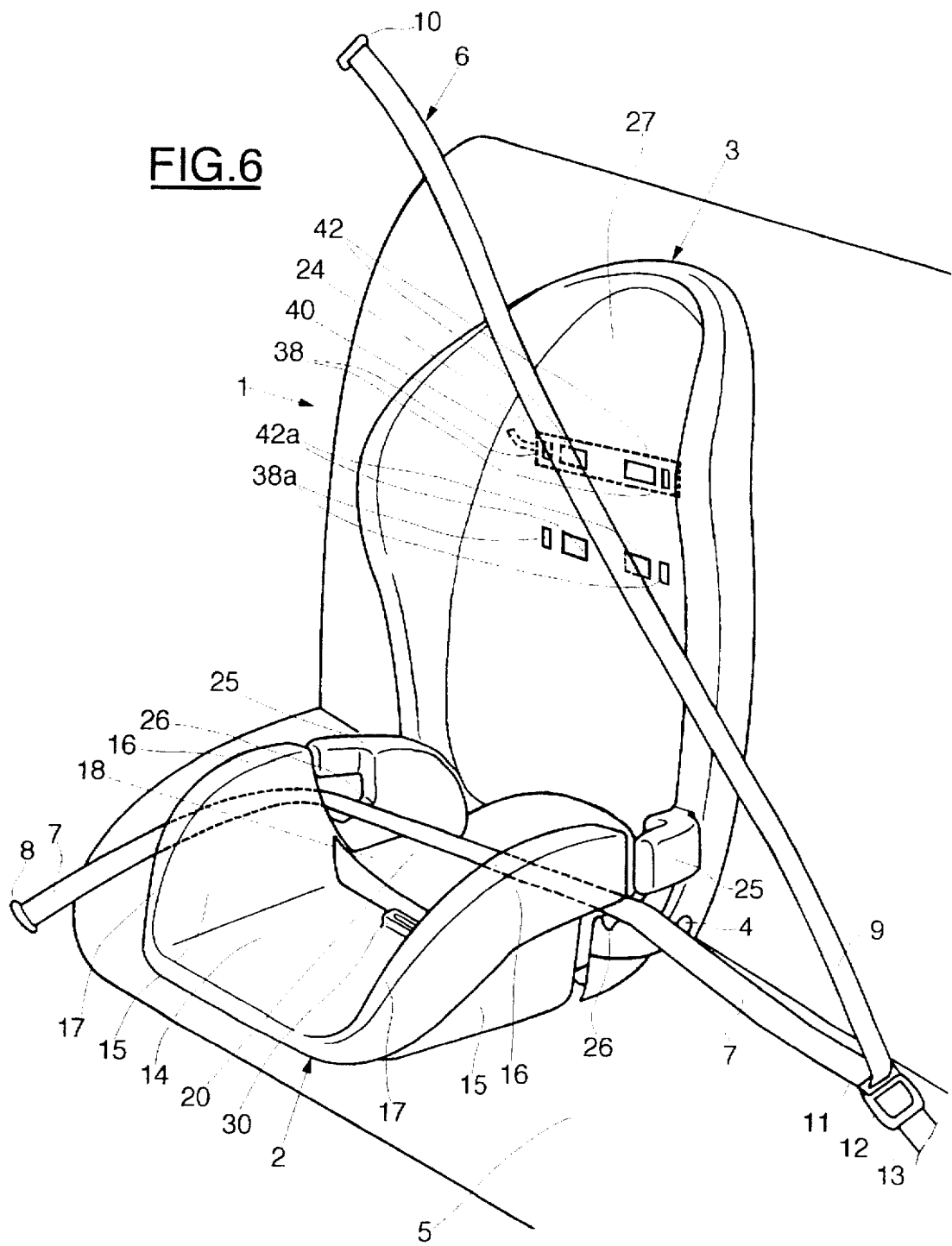
FIG. 6 is a view analogous to FIG. 1 showing the mounting of the seat for a taller child.

A small child, usually weighing less than 18 kg, must be secured to the seat 1 by means of the safety harness 23. The position of the harness 23 must naturally be adapted to suit the child. This is made possible by the facility for adjusting the height of the mounting plate 24. The bottom slots, for example the slots 38a shown in FIGS. 1 and 6, are therefore used for the smallest child.

For a larger child, the position of the mounting plate 24 is changed. To this end the mounting plate 24 is separated from the back part, after which the rod 40 is removed entirely, so that the buckles 22a can be extracted by passing them through the openings 35 and over the ends of the mounting plate 24. Extracted from the openings 38a, the buckles 22a are then passed through the openings 38 in the wall 27 of the back part 3, at a different height. The buckles 22a are attached to the mounting plate 24 by carrying out the same operations in the reverse order. The mounting plate 24 is then clipped to the wall 27 using the slots 38 that are higher up than the slots 38a.

The seat 1 is then placed on the vehicle seat 5 as shown in FIG. 1. The safety belt 6 of the vehicle is drawn out and the chest portion 9 is passed behind the back portion 3. The lap portion 7 is placed on the lateral rims 16 of the seat part 2. The safety belt 6 is locked by means of the locking device 12. The child seat 1 is then fixed to the vehicle seat 5 simply by sliding the lap portion 7 forwards along the lateral rims 16 and down their inclined front portion 17, enabling the lap portion 7 to be passed under the bottom surface of the seat part 2 and into the passage 18, to rise up on each side of the seat part 2 through the open slots 19 until the two lateral parts of the lap portion 7 pass over the two bearing edges 26, as shown in FIG. 1. The chest portion 9 of the safety belt 6 is passed across the mounting plate 24 after the sliding rod 40 has been extracted from one of the saddles 32 to a position enabling easy insertion of the chest strap 9 into the guide and locking means comprising the combination of the mounting plate 24 and the rod 40. The rod 40 is then pushed in, sliding along the mounting plate until it reenters the end saddle 32. The rod can then be turned either to the position shown in FIG. 4 to enable the position of the seat 1 to be adjusted relative to the vehicle seat 5 or into the locked position shown in FIG. 5, in which the chest strap 9 is locked and immobilized relative to the seat 1. Note that this position is the preferred position for use of the seat 1. In this position the seat 1 is firmly secured to the seat 5 of the vehicle.

The seat 1 being secured to the seat 5 of the vehicle by means of the safety belt 6 in this way, the child can be placed in the seat 1, which naturally includes padding that is not shown in FIG. 1. The child is secured to the seat 1 by means of the safety harness 23.

Although in the example shown there are only two positions for adjusting the height of the mounting plate 24, it will be understood that a greater number of positions could be provided. A continuous height adjustment is also feasible.

In all cases the child is firmly secured to the seat 1 by their safety harness 23. As the attachment points of the shoulder straps 22 are the saddles 32 attached to the mounting plate 24, it is clear that in the event of an accident, i.e. in the event of a sudden force tending to displace the child and the seat 1 towards the front, it is the chest strap 9 of the safety belt 6 of the vehicle that restrains the child, being held by the metal rod 40 retained in the two saddles 32 on the mounting plate 24. The forces applied to the safety harness 23 are therefore entirely absorbed by the chest strap 9 of the safety belt 6 of the vehicle itself. Because of this particular feature, the back part 3 can be made lighter in weight, as it does not contribute to the mechanical strength in the event of an accident.

In the case of a taller child, and in particular a child weighing more than about 18 kg, it is preferable to remove the safety harness 23, which is a simple procedure as previously described. The anchorage means 30 also enable the strap 29 to be removed. The seat 1 is then installed on the vehicle seat 5 as shown in FIG. 6. As before, the seat 2 is placed directly on the vehicle seat 5. The child is placed in the seat. The safety belt 6 is then attached to the locking device 12, the chest portion 9 passing in front of the child and therefore also in front of the back part 3. The lap portion 7 is passed over the thighs of the child and then moved from the upper part of the rim 16 to the bearing rims 26, exiting the upper part of the open slots 19 at the level of the hooks 25. The child is then secured to the seat 1 directly by the lap portion 7 and the chest portion 9 of the vehicle safety belt 6. In the event of an accident the child and the seat 1 are firmly secured to the vehicle seat 5 by the hooks 25.

In a preferred embodiment, as shown in the figures, the back part 3 can be inclined to the seat part 2 in various positions by means of the hinge pin 4, means not shown in the figures being used to lock the back part in the appropriate position.

The invention therefore provides a seat that is easy to install and to use and that is secured to the vehicle seat in a particularly effective way, regardless of the height of the child.

Figure 7:
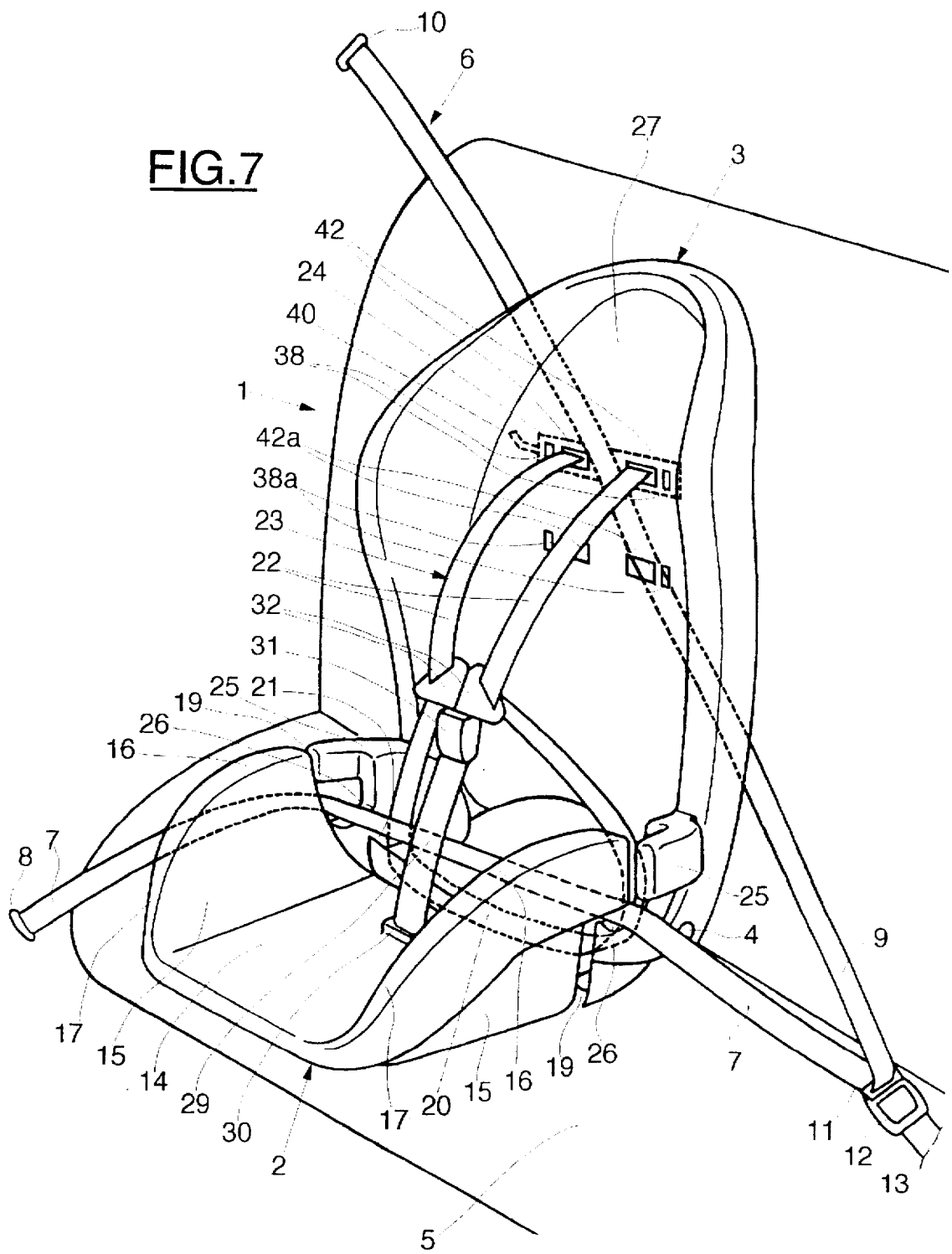
FIG. 7 is a view analogous to FIG. 1 with a different conformation of the seat part and a different way of guiding the lap portion of the safety belt.

FIG. 7 shows a variant of the seat part with no bottom passage 18 for the lap portion 7 of the safety belt. In this case, when installing the seat 1 equipped with its safety harness 23, the lap portion 7 of the vehicle safety belt 6 is simply passed over the lateral rim 16 and inserted into the open slots 19, as in the situation shown in FIG. 6, passing over the top of the seat part 2, behind the crotch strap 29, but n front of the branches of the shoulder straps 22 of the harness.

To install the child in the seat equipped in this way with its safety harness, the child is seated on top of the lap portion 7 of the belt 6 and the harness is fastened in the same manner as in FIG. 1.

The guide means for the lap portion 7 of the safety belt then comprise only the slots 19 and the bearing rims 26, but not the bottom passage 18.

I claim:

1. A child seat including a seat part and a back part and adapted to be placed on and fixed to an automobile vehicle seat equipped with a three-point safety belt having a lap portion and a chest portion, characterized in that the seat part is adapted to be placed directly on the automobile vehicle seat and includes guide means for the lap portion of the safety belt and in that the back part has, on its rear face, means for guiding and immobilizing the chest portion of the safety belt, said guiding and immobilizing means being adjustable in height on the back part and further including means for fixing ends of shoulder straps of a safety harness passing through the back part of the child seat, the guiding and immobilizing means comprising a mounting plate, mounted to the back of the child seat, provided with retaining members for a locking member mobile between a first position allowing insertion of the chest part of the belt, a second position in which said chest portion is guided and a third position in which said chest portion of the belt is immobilized, the retaining members being in the form of two saddles, attached to the mounting plate, cooperating with a sliding rod, which passes through the saddles, said sliding rod having a curved part providing the locking member.

2. The child seat according to claim 1 characterized in that the ends of the shoulder straps form loops which pass around the retaining members.

3. The child seat according to claim 1 characterized in that the back part is hinged to the seat part to enable the back part to be moved between different inclinations.

4. The child seat according to claim 1 characterized in that the seat part includes anchorage means for a crotch strap of the safety harness.

5. The child seat according to claim 1 characterized in that the seat part has a bottom passage for the lap portion of the safety harness.

6. A child seat including a seat part and a back part and adapted to be placed on and fixed to an automobile vehicle seat equipped with a three-point safety belt having a lap portion and a chest portion, characterized in that the seat part is adapted to be placed directly on the automobile vehicle seat and includes guide means for the lap portion of the safety belt and in that the back part has, on its rear face, means for guiding and immobilizing the chest portion of the safety belt, said guiding and immobilizing means being adjustable in height on the back part and further including means for fixing ends of shoulder straps of a safety harness passing through the back part of the child seat, the guiding and immobilizing means comprising a mounting plate, mounted to the back of the child seat, provided with retaining members for a locking member mobile between a first position allowing insertion of the chest Part of the belt, a second position in which said chest portion is guided and a third position in which said chest portion of the belt is immobilized, the mounting plate having on opposite sides of the retaining members first open slots through which ends of the shoulder straps of the safety harness are passed and fixed to the retaining members.

7. The child seat according to claim 6 characterized in that the ends of the shoulder straps form loops which are adapted to pass around the retaining members.

8. The child seat according to claim 6 characterized in that the back part is hinged to the seat part to enable the back part to be moved between different inclinations.

9. The child seat according to claim 6 characterized in that the seat part includes anchorage means for a crotch strap of the safety harness.

10. The child seat according to claim 6 characterized in that the seat part has a bottom passage for the lap portion of the safety harness.

11. A child seat including a seat part and a back part and adapted to be placed on and fixed to an automobile vehicle seat equipped with a three-point safety belt having a lap portion and a chest portion, characterized in that the seat part is adapted to be placed directly on the automobile vehicle seat and includes guide means for the lap portion of the safety belt and in that the back part has, on its rear face, means for guiding and immobilizing the chest portion of the safety belt, said guiding and immobilizing means being adjustable in height on the back part and further including means for fixing ends of shoulder straps of a safety harness passing through the back part of the child seat, the guiding and immobilizing means comprising a mounting plate, mounted to the back of the child seat, provided with retaining members for a locking member mobile between a first position allowing insertion of the chest part of the belt, a second position in which said chest portion is guided and a third position in which said chest portion of the belt is immobilized, wherein the height adjustable feature is provided by the mounting plate comprising clipping means engaging with the edges of second slots provided at different heights in the park of the seat.

12. The child seat according to claim 11 characterized in that the back part is hinged to the seat part to enable the back part to be moved between different inclinations.

13. The child seat according to claim 11 characterized in that the seat part includes anchorage means for a crotch strap of the safety harness.

14. The child seat according to claim 11 characterized in that the seat part has a bottom passage for the lap portion of the safety harness.

15. A child seat including a seat part and a back part and adapted to be placed on and fixed to an automobile vehicle seat equipped with a three-point safety belt having a lap portion and a chest portion, characterized in that the seat part is adapted to be placed directly on the automobile vehicle seat and includes guide means for the lap portion of the safety belt and in that the back part has, on its rear face, means for guiding and immobilizing the chest portion of the safety belt, said guiding and immobilizing means being adjustable in height on the back part and further including means for fixing ends of shoulder straps of a safety harness passing through the back part of the child seat, the guiding and immobilizing means comprising a mounting plate, mounted to the back of the child seat, provided with retaining members for a locking member mobile between a first position allowing insertion of the chest part of the belt, a second position in which said chest portion is guided and a third position in which said chest portion of the belt is immobilized, lateral surfaces of the seat part including parts delimiting one side of third open slots in the lower portion of the seat adapted to receive the lap portion of the safety belt.

16. The child seat according to claim 15 characterized in that the delimiting parts are hook-shaped, each hook incorporating a bearing rim for the lap portion of the safety belt.

* * * * *